United States Patent
Abogado et al.

(10) Patent No.: US 11,709,760 B1
(45) Date of Patent: Jul. 25, 2023

(54) AUTOMATION FAILURE DIAGNOSTIC TOOL

(71) Applicant: T-MOBILE INNOVATIONS LLC, Overland Park, KS (US)

(72) Inventors: Alex Pango Abogado, Ashburn, VA (US); Brian Dean Saunders, Lenexa, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 16/940,309

(22) Filed: Jul. 27, 2020

(51) Int. Cl.
  *G06F 11/36* (2006.01)
  *G06F 11/14* (2006.01)
  *G06F 8/65* (2018.01)

(52) U.S. Cl.
  CPC .......... *G06F 11/366* (2013.01); *G06F 8/65* (2013.01); *G06F 11/1433* (2013.01)

(58) Field of Classification Search
  CPC ...... G06F 11/366; G06F 11/1433; G06F 8/65; G06F 8/60–66
  See application file for complete search history.

(56) References Cited

U.S. PATENT DOCUMENTS

| | | | | |
|---|---|---|---|---|
| 5,287,461 A * | 2/1994 | Moore | .................. | G06F 13/387 709/219 |
| 7,792,800 B1 * | 9/2010 | Carson, Jr. | ............ | H04L 41/082 707/640 |
| 9,317,278 B1 * | 4/2016 | Walker | ..................... | G06F 8/60 |
| 10,732,962 B1 * | 8/2020 | Florescu | ............. | G06F 11/0706 |
| 2003/0023839 A1 * | 1/2003 | Burkhardt | ................ | G06F 8/63 713/1 |
| 2016/0094483 A1 * | 3/2016 | Johnston | ................ | H04L 67/10 709/226 |
| 2019/0122160 A1 * | 4/2019 | Kolandaiswamy | | ......................... G06F 11/3476 |
| 2019/0179707 A1 * | 6/2019 | Sharkey | ............. | G06F 11/1433 |

(Continued)

OTHER PUBLICATIONS

Dunagan, John, et al. "Fuse: Lightweight guaranteed distributed failure notification." Proceedings of the 6th Symposium on Operating Systems Design and Implementation (OSDI). No. CONF. 2004. (Year: 2004).*

(Continued)

*Primary Examiner* — S. Sough
*Assistant Examiner* — Joanne G Macasiano

(57) ABSTRACT

A method of monitoring an automation script modifying software on a server. The method of monitoring comprises monitoring a server for an active customer process by a master application executing on a computer, starting an automation script with multiple sequential instructions for updating the software executing on the server by the master application, monitoring a resultant condition of the automation script after each instruction by the master application, creating a readable log of the resultant condition of the automated script by the master application after each instruction, and generating a user notification with an actionable link by the master application in response to a failure condition of the automated script. When the user activates the actionable link, the master application opens a screen group that includes a screen for instructions to the server from the master application.

20 Claims, 10 Drawing Sheets

(56) References Cited

U.S. PATENT DOCUMENTS

2021/0109734 A1\* 4/2021 Vittal ................. G06F 11/1433
2021/0271467 A1\* 9/2021 Tinker ..................... G06F 8/65

OTHER PUBLICATIONS

Lee, Jonghyun, et al. "RISE: A grid-based self-configuring and self-healing remote system image management environment." 2006 Second IEEE International Conference on e-Science and Grid Computing (e-Science'06). IEEE, 2006. (Year: 2006).\*

Sun, Daniel, et al. "Multi-objective optimisation of online distributed software update for DevOps in clouds." ACM Transactions on Internet Technology (TOIT) 19.3 (2019): 1-20. (Year: 2019).\*

Brown, Stephen, and Cormac J. Sreenan. "Software updating in wireless sensor networks: A survey and lacunae." Journal of Sensor and Actuator Networks 2.4 (2013): 717-760. (Year: 2013).\*

\* cited by examiner

US 11,709,760 B1

AUTOMATION FAILURE DIAGNOSTIC TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software updates performed on servers, gateways, and nodes require multiple steps to be performed by authorized personnel following a written procedure. The required steps may involve multiple pieces of equipment made by multiple vendors. The written procedure may be hundreds of pages long and require multiple days to complete.

SUMMARY

In an embodiment, a computer-implemented method of monitoring an automation script modifying software on a server is disclosed. The computer-implemented method of monitoring an automation script modifying software on a server comprises monitoring a server for an active customer process by a master application executing on a computer, starting an automation script with multiple sequential instructions for updating the software executing on the server by the master application, monitoring a resultant condition of the automation script after each instruction by the master application, creating a readable log of the resultant condition of the automated script by the master application after each instruction, and generating a user notification with an actionable link by the master application in response to a failure condition of the automated script. The method further comprises opening a screen group by the master application in response to activating the actionable link. In an embodiment, the screen group includes a screen for instructions to the server from the master application. In an embodiment, the screen group includes a screen displaying a readable log of the update to the server from the master application.

In another embodiment, the computer-implemented method of monitoring an automation script modifying software on a server is disclosed. The method comprises monitoring a status of a server by a master application executing on a computer, starting an automation script with multiple sequential instructions for updating the software executing on the server by the master application, monitoring a resultant condition of the automation script after each instruction by the master application, creating a readable log of the resultant condition of the automated script by the master application after each instruction, starting an automated sub-script by the master application in response to receiving a failure notification from the automated script, creating a readable log of the resultant condition of the automated sub-script by the master application for each instruction, and generating a user notification with an actionable link by the master application in response to a failure condition of the automated sub-script. The method further comprises opening a screen group by the master application in response to activating the actionable link. In an embodiment, the screen group includes a screen for instructions to the server from the master application. In an embodiment, the screen group includes a screen displaying a readable log of the update to the server from the master application.

In another embodiment, a computer-implemented method of monitoring an automation script modifying software on a server is disclosed. The method comprises establishing a queue of update sessions with servers to be updated by a scheduler application executing on a computer, starting a master application by an automation script within the update session, starting an automation script with multiple sequential instructions for updating the software executing on the server by the master application, monitoring a resultant condition of the automated script after each instruction from the automation script by each master application executing in the update session, creating a readable log of the result of the automated script by the master application for each instruction from the automated script, and generating a user notification with an actionable link by the master application in response to a failure condition of the automated script. The method further comprises opening a screen group by the master application in response to the actionable link and closing the update session when the automation script within the master application finishes.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
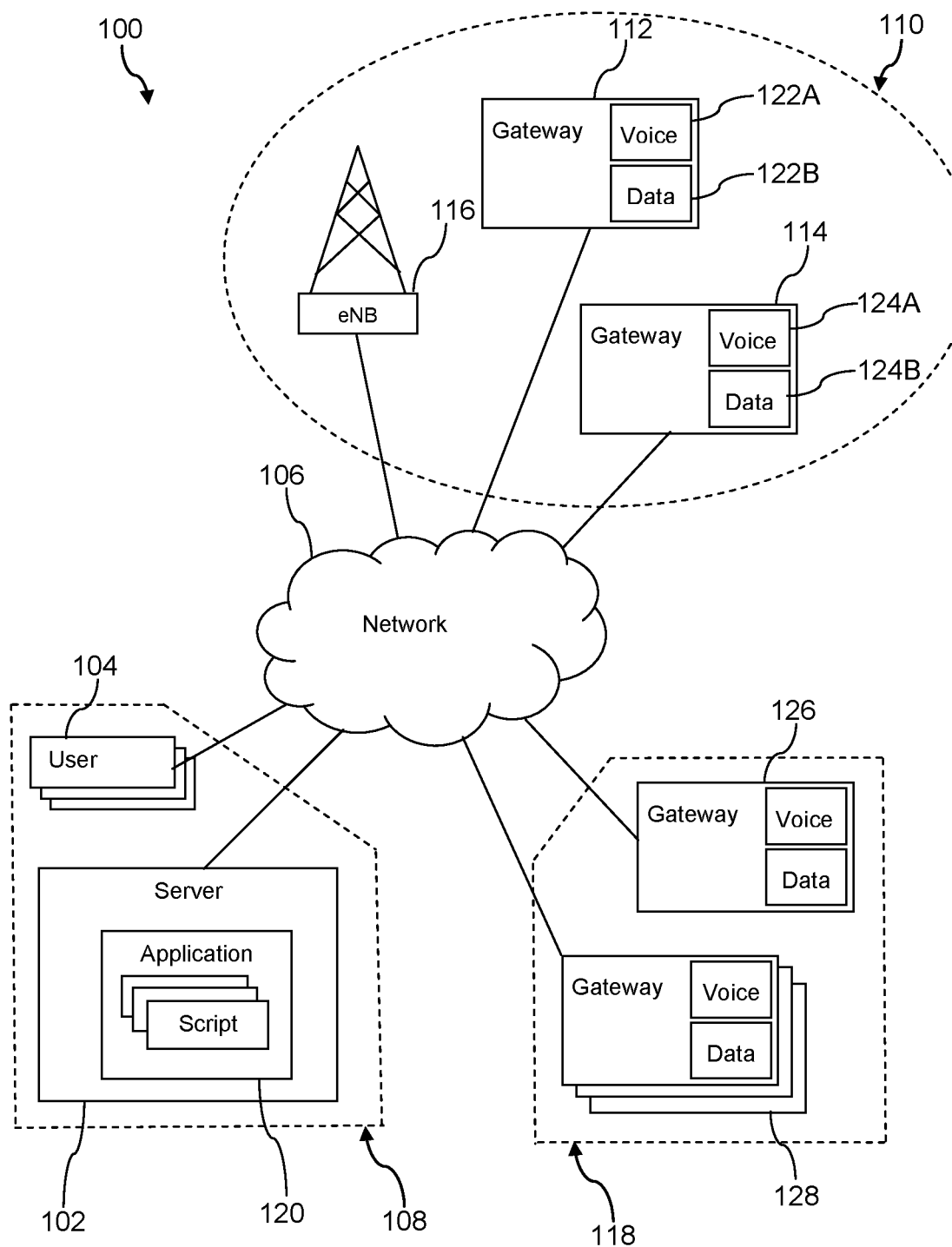
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Communication networks may be made up of multiple types of servers such as network nodes and gateways. Each type of servers, network nodes, or gateways, may have a single redundant server to ensure uninterrupted service to customers. For example, a group of five active gateways may include a single inactive gateway in a redundant role ready to assume traffic load and go active when one of the five active gateways experience trouble. The software on these types of servers may be updated by authorized personnel following a written procedure validated by testing in the lab. These software updates may entail multiple steps performed on multiple different pieces of equipment. These software updates may be scheduled during a maintenance time window at night. The software updates may be performed on one network node or gateway at a time so that service is not disrupted. In an embodiment, a software update process may be sped up by one or more automation scripts written in a programming language. The software automation script may in part implement a manual procedure validated in the lab. However, should a problem arise while running the automation script, a technician desirably trouble-shoots the problem so that the software update on the network node or gateway can be completed within the maintenance time window.

As disclosed herein, an automation diagnostic tool monitors the software automation script as each step of the validated procedure progresses. In the event an error occurs, the automation diagnostic tool will send an email with an alert and a link to notify a technician of an error in the update process. When the technician clicks on the link in the email, a window or series of windows from the automated diagnostic tool will open on the computer or laptop screen of the technician. The automation diagnostic tool will open a first window showing the location in the automation script of the script failure. The automation diagnostic tool will open a second window that presents the manual procedure at the point where the automation script failed. The automation diagnostic tool will open a third window that shows logs generated by the script. The logs generated by the script may suggest to the technician where and how the script failed. The automation diagnostic tool will open a fourth window that is a user interface that is already logged into the server (network node or gateway) so that the technician can enter commands to clear the fault and restart the automation script. In an embodiment, the automation script may have sub-scripts written into the script to solve simple or repetitive errors. These sub-scripts will automatically run when the script fails. An email may be generated to notify the technician of the fault and results of the sub-script. The fault and results of the sub-script are logged by the script.

In an embodiment, the automation diagnostic tool may log the inputs to the human interface and the results of each command. When a fault in the automation script is encountered and the automation diagnostic tool opens the user interface, all of the technician's inputs may be logged until the fault is cleared. The log of the user interface may be analyzed and used to develop a sub-script to clear subsequent faults at that location in the automation script. In an embodiment, the automation diagnostic tool may generate separate logs to notify vendors of faults encountered by the automation script when accessing equipment manufactured by them.

In an embodiment, a software automation scheduler monitors the progress of each automation diagnostic tool as scheduled. The software automation scheduler schedules execution of the automation diagnostic tool to monitor the automation script on one or more identical servers (network nodes or gateways) to be updated. The software automation scheduler may run a subsequent schedule with one update starting after another finishes or a concurrent schedule with multiple updates running simultaneously. The software automation scheduler may halt subsequent updates if a fault is encountered by the automation diagnostic tool. The software automation scheduler may pause concurrent updates if a fault is encountered by the automation diagnostic tool in one of several concurrent updates running.

An automated diagnostic tool is a technical solution to the technical problem of conducting software updates on computers. A gateway may have a software update to add functionality, to enhance performance, or to complete a needed security update. The gateway may include multiple types of equipment from multiple vendors. One or more gateways may be updated during a single maintenance time window typically in the middle of the night when customer traffic is lowest. An automated script may be used to shorten the amount of time needed to perform the update. These automated scripts are tested in the lab environment to ensure performance however, problems may occur during the update process that may cause the automation script to stop. A technician may be notified to trouble-shoot the update process, diagnose the problem, and restart the automated script. The technician may be under a lot of stress as they may not know the update process, may not be familiar with the equipment being updated, may have more than one update processing, and a limited maintenance time window to complete the update. The trouble-shooting may be an arduous task for a technician not familiar with the gateway equipment nor the automated script that needs to finish running within the maintenance window. The automated diagnostic tool provides a technical solution by providing the technician with multiple screens open to the location of the fault in the automated script. One window may open a manual copy of the update process, positioned to present the command line that the automated script stopped on highlighted. The trouble-shooting of the fault may be simplified by opening a second window with a log of the steps completed and indicating where the fault occurred. The fault clearing process may be sped-up by opening another window with right permissions into the gateway to clear the fault and restart the automation script. Said in other words, a screen may be presented with a command line to the subject server or computer, with the user logged onto the computer with the appropriate user privileges to resolve the problem. It will be appreciated that a maintenance technician may be responsible for maintaining a fleet of hundreds or thousands of servers, and having a window open with a command line on the correct server may save time looking up passwords for the subject server and save the time or errors and retries of entering the logon credentials. The automated diagnostic tool provides the technician with the resources needed to get them up to speed and solve the fault in a timely manner.

The automated diagnostic tool records the steps taken by the technician to clear the fault. The technician may alert a vendor of a fault encountered. The technician may edit the automated script based on the recording of the steps. The technician may generate a sub-script that the automated diagnostic tool automatically runs when a fault is encountered at this step. Multiple sub-scripts may be generated for a common fault encountered by the automated diagnostic tool.

In an embodiment, a machine learning application may analyze the recordings of the steps or one or more technicians involved in maintaining servers on one or more occasions and automatically synthesize sub-scripts from its analysis of the recordings of the steps. When a pattern of failure to resolve a script problem is identified by the machine learning application, the machine learning application may formulate a script statement that invokes the automatically generated sub-script when the subject error or problem repeats during execution of the script. Both the script statement that invokes the automatically generated sub-script and the instructions of the automatically generated sub-script can be automatically built into an updated version of the script by the machine learning application.

Turning now to FIG. 1, a telecommunication system 100 is described. In an embodiment, the telecommunication system 100 comprises a cell node 110, a service center 108, and a remote gateway cluster 118, communicatively attached to a network 106. The network 106 may be one or more public networks, one or more private networks, or a combination thereof. Part of the internet may be included in the network 106.

The cell node 110 may be communicatively connected to network 106. The cell node 110 may comprise a cell site 116 with a primary gateway 112 and a secondary gateway 114. The primary gateway 112 may be responsible for separating voice traffic 122A from data traffic 122B that was received from the cell site 116. Gateway 114 may be responsible for separating voice traffic 124A from data traffic 124B that was received from the cell site 116. Gateway 114 may be a secondary gateway that is active concurrently with gateway 112 or maybe on standby in case of a failure or disruption in service if gateway 112 experiences a fault. These gateways may be formed of multiple types of equipment that work in concert to make up a single gateway; e.g. the gateway may include a server, auto-stager, voice switch, and elastic services controller and each type of equipment may be provided by a different vendor. A software upgrade to a gateway may include a software upgrade to one or more parts of the gateway.

A service center 108 that provides support for the cell node 110 may be communicatively connected to network 106. A plurality of user devices 104 may be communicatively connected via the network 106. The user device 104 may be a workstation computer, a laptop computer, a tablet computer, a smartphone, a mobile phone, or a gaming device. A user, e.g., service technician, may execute a service application 120 on the service center server 102 from a user device 104 to access, monitor, or maintain the equipment within the cell node 110 such as the cell site 116, gateway 112, and gateway 114. The user device 104 may direct the service application 120 to communicatively connect to the equipment forming cell node 110 through the network 106.

The remote gateway cluster 118 may be a pool of regional gateways communicatively connected to the network 106. The remote gateway cluster 118 may include a plurality of active gateways 128 and a standby gateway 126. The standby gateway 126 may replace one of the active gateways 128 or may support one of the active gateways 128 if a gateway experiences a fault during operation.

Figure 2:
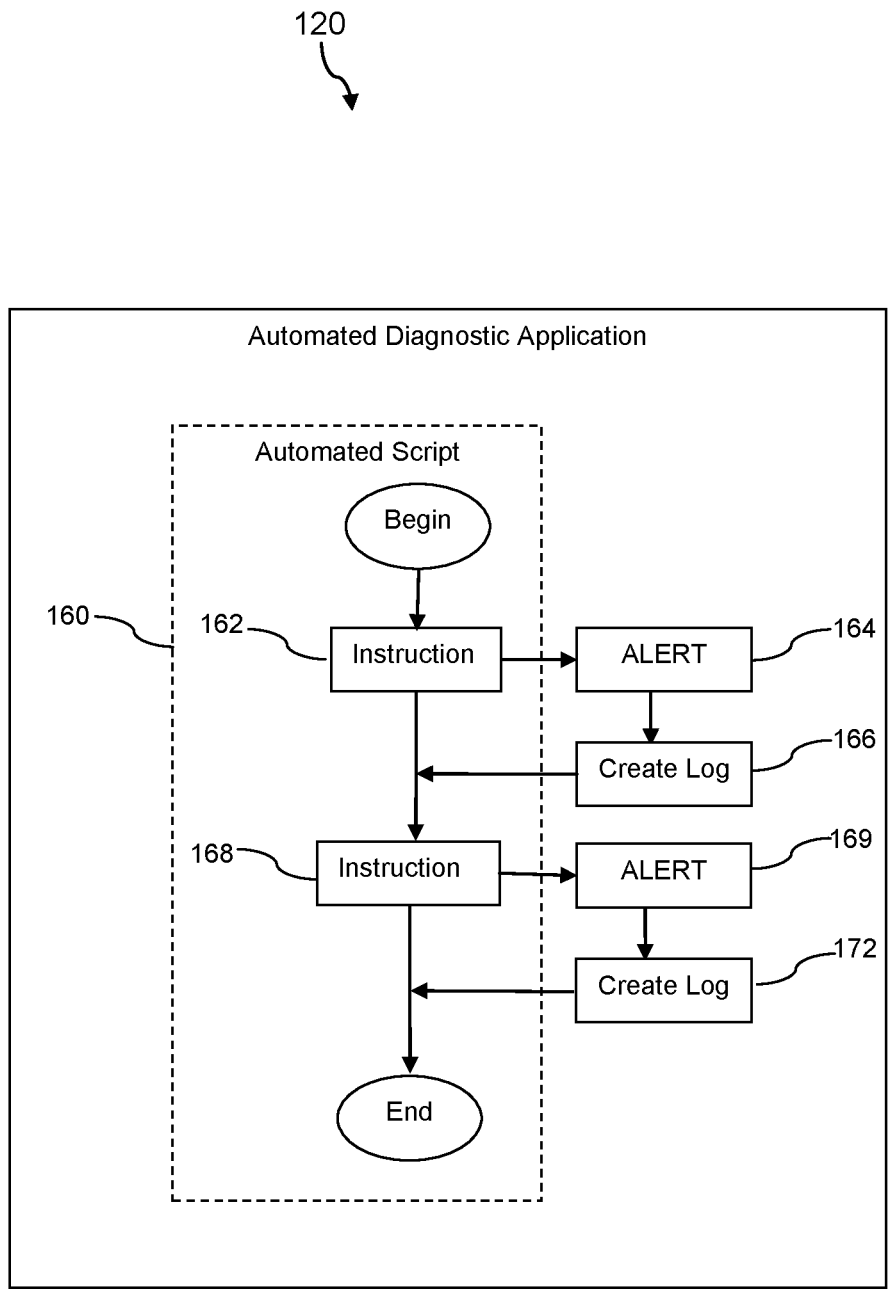
FIG. 2 is a logical flow diagram depicting an automated diagnostic application according to an embodiment of the disclosure.

Turning now to FIG. 2, an automated diagnostic application 120, as shown in a logical flow diagram, is described. An automated diagnostic application 120 may be a service application or a master application used to update a gateway such as gateway 112. The automated diagnostic application 120 may have an automated script 160 that consists of multiple instructions (e.g., commands) written in a high level programming language or scripting language such as Python, Java, JavaScript, Perl, Ruby, Tcl, or Smalltalk. The term instruction is defined as a command, multiple commands, and a line of script (e.g., high level programming language) that may contain one or more instructions. This type of high level programming language may include instructions that control the hardware function (e.g., on, off, restart, etc.), firmware, software, and operating system (e.g., iOS, macOS, Microsoft Windows, Linux, etc.). An automated script 160 may consist of hundreds of lines of script (e.g., high level programming language) with multiple instructions on each line. The automated script 160 may include a written status report, called a script log, after each line has completed. The script log may report a line of script that has completed, the status of the script, and an error message. The error messages may be of different priority levels such as information, warning, error, and critical error. Any of the error messages may stop the execution of an instruction within the automated script.

The automated script 160 may be written to monitor the gateway, idle the gateway, update the gateway, and restart the gateway. The gateway 112 may be a primary gateway that is in service. The automated script 160 may first monitor gateway 112 to report the number of active customer processes that have to be completed to avoid customer interruption. In the example of a cell node 110, the gateway 112 may have a number of active customer phone calls utilizing one or more pieces of equipment. The automated script 160 may pause and monitor the gateway 112 until the active customer phone calls are completed to prevent service interruption.

The automated script 160 may idle the gateway 112 and route all customer traffic (e.g. customer phone calls) to the secondary gateway 114. The automated script 160 may monitor the status of the secondary gateway 114 to confirm a successful rerouting of services.

The automated script 160 may update the firmware and/or software on the gateway 112. The gateway 112 may comprise a single server, multiple servers, or multiple pieces of equipment. The update process may comprise updates to one or more of the pieces of equipment. The update process may entail one or more pieces of equipment to turn off, restart in a safe mode, apply an update, report status, and restart.

The automated script 160 may restart the gateway 112 after the update process has been completed. The restart process may require a sequential restart of each piece of equipment. Each piece of equipment may be monitored after restart to ensure proper function. The automated script 160 may return the gateway 112 to service and reroute the traffic from the secondary gateway 114 back to the primary gateway 112.

The automated diagnostic application 120 alerts the user when the automated script 160 reports an error, for example sending an email. As shown in FIG. 2, the automated script 160 may execute instruction 162. The automated script 160 may include hundreds of lines of script so instruction 162 may be a single exemplary line of script. The automated script 160 may execute instruction 162 on the gateway 112. If instruction 162 completes without an error, then automated script 160 moves to instruction 168. However, if instruction 162 returns an error, the automated script 160 stops to report the error to the automated diagnostic application 120. The automated diagnostic application 120 generates a user alert 164 and waits for the response from the user. The user alert 164 may be an email, short message service (SMS) text message, multimedia messaging service (MMS) text message, or a message alert internal to a proprietary system. The user alert 164 may be an email with an actionable link such as hypertext with a network address for the automated diagnostic application 120.

Figure 3:
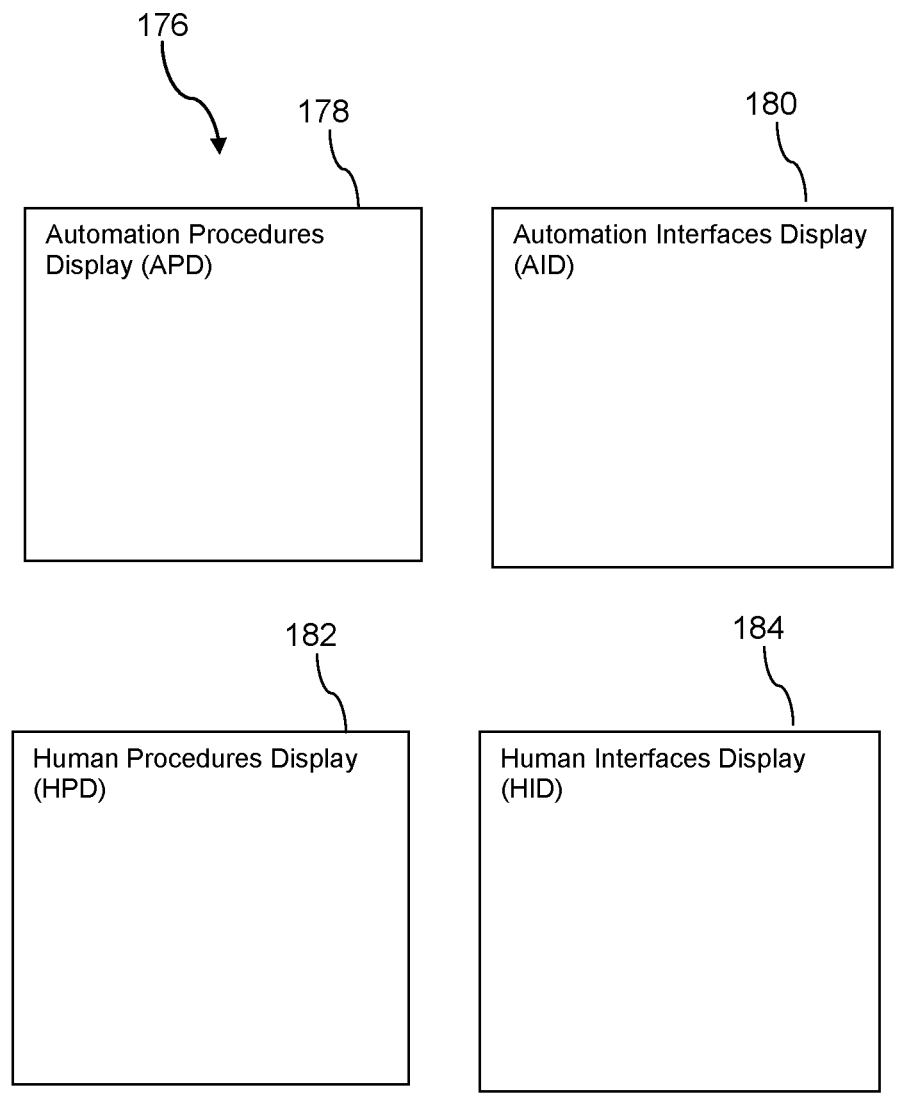
FIG. 3 is an illustration of a screen group according to an embodiment of the disclosure.

Turning now to FIG. 3, an alert screen group 176 that may be provided by the automated diagnostic application 120 is described. The notification sent by the automated diagnostic application 120 to the user device 104 (or user devices) may include a link. When the notification is presented by the user device 104 and the link is selected by the user (e.g., the link is "clicked on"), an alert screen group 176 is launched by the automated diagnostic application 120 on the user device 104. The alert screen group 176 may include a group of screens or windows including an automation procedures display (APD) screen 178, an automation interfaces display (AID) screen 180, a human procedures display (HPD) screen 182, and a human interfaces display (HID) screen 184.

The APD screen 178 of the alert screen group 176 may be a screen that presents a scrollable view of the instructions of the automated script 160 showing the line with the exception. Multiple lines of the automated script 160 may be shown, but the script instruction that failed to complete or produced the error would be highlighted.

The AID screen 180 of the alert screen group 176 may be a screen that presents the error log from the automated script 160. The AID screen 180 may also present logs or instant reports from all the effected pieces of the gateway 112 during the update.

The HPD screen 182 of the alert screen group 176 may be a screen that presents a manual process corresponding to the automation process implemented by the automated script 160. The manual procedures may be hundreds of pages long with each step of the update process written out. The HPD screen 182 may open directly to the instruction 162 (as shown in FIG. 2) where the automated script 160 stopped. Providing the manual procedures in the HPD screen 182 may give the user additional information and context to find a solution to the error.

The HID screen 184 of the alert screen group 176 may be a screen that presents a command line prompt for the server where the exception from the automated script 160 occurred. The automated diagnostic application 120 may log into the server and provide the HID screen 184 with a command line prompt. Alternatively, the automated diagnostic application 120 may provide the IP address, login information, and password for the server being updated. The HID screen 184 opened from the automated diagnostic application 120 for the user on the user device 104 may be logged into one or more devices of the gateway 112 being updated by automated script 160.

Returning to FIG. 2, the user receives the user alert 164 with the actionable link when the automated diagnostic application 120 receives an error from the automated script 160. Selecting the link (e.g., "clicking on" the link) opens an alert screen group 176 for the user. The user can identify the line of code in the APD screen 178, read the manual update procedure in the HPD screen 182, read the automation script log and equipment status logs in AID screen 180, and enter commands for the gateway 112 equipment on the HID screen 184. The error may be due to a typo in the automated script 160. The error may be due to a difference in equipment used in a gateway 112 compared to other gateways. For example, part of the gateway 112 may be manufactured by a different vendor than what the automated script 160 was originally written for. The error may also be due to equipment nearing the end of its service life. The alert screen group 176 may help the user determine the source of the error and how to clear the error. The user may enter one or more commands to clear the error on the HID screen 184 after the user alert 164.

The automated diagnostic application 120 records the commands the user applies to clear the user alert 164 to generate create (e.g., write to) a diagnostic log 166. The automated diagnostic application 120 may then restart the automated script 160 and the automated script 160 then moves to the next instruction 168. The automated diagnostic application 120 may send the diagnostic log 166 to the vendor who produced one or more components of gateway 112. The automated diagnostic application 120 may send the diagnostic log 166 to the user (or users) for review. The user may revise or rewrite the instruction 162 of the automated script 160.

The automated script 160 may complete the next instruction 168 or generate a user alert 169. A user alert, such as 169 and 164, may be generated for each fault encountered by the automated script 160. A diagnostic log 172 may be created by the automated diagnostic application 120 comprised of the commands used to clear user alert 169.

Figure 4:
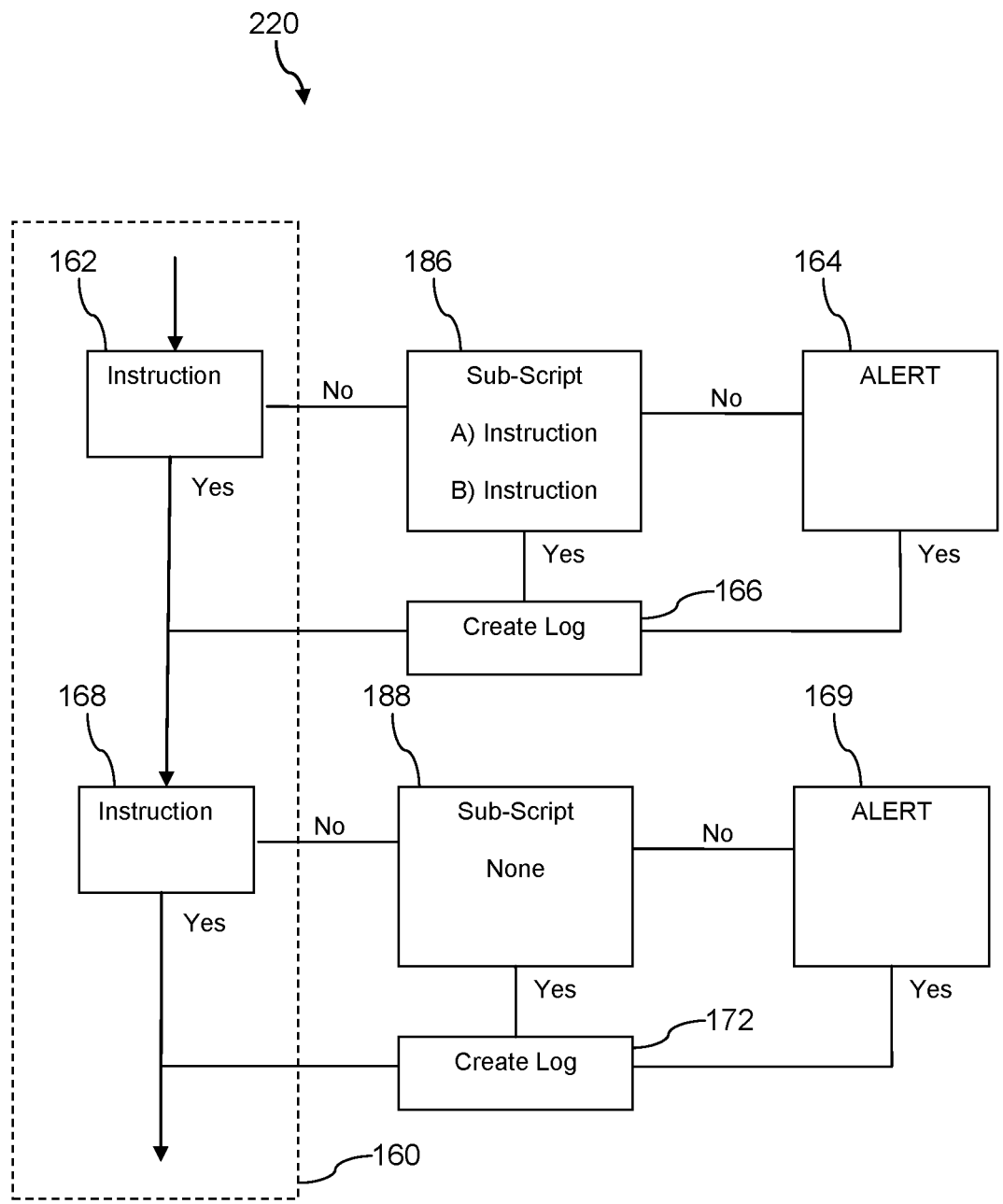
FIG. 4 is a logical flow diagram depicting an automated diagnostic application according to an embodiment of the disclosure.

Turning now to FIG. 4, in an embodiment, the automated diagnostic application 220 may include one or more subscripts 186 as shown in the logical flow diagram. The automated diagnostic application 220 may execute in the same manner as described in FIG. 2. The instruction 162 in the automated script 160 may produce an error code. The automated diagnostic application 220 may have a sub-script 186 to clear the error before a user alert 163 164 is sent. The sub-script 186 may comprise one or more instructions written in script or a high level programming language. These instructions may be one or more commands that are used to clear errors commonly encountered with the equipment addressed by instruction 162 of the automated script 160. For example, the sub-script 186 may be written for an error encountered when a part of the gateway 112 is made by a different vendor. If the sub-script 186 clears the error, then automated diagnostic application 220 creates a diagnostic log 166 and restarts the automated script 160. If the sub-script 186 doesn't clear the error, then a user alert 163 164 is sent with an actionable link by the automated diagnostic application 220.

The automated script 160 may generate a second error at instruction 168. The automated diagnostic application 220 may not have a sub-script 188 written for an error generated at instruction 168. The automated diagnostic application 220 then moves from sub-script 188 to user alert 165 169 which generates a user notification comprising an actionable link that is sent by the automated diagnostic application 220. The automated diagnostic application 220 may open alert screen group 176 (as described in FIG. 3) for the user to clear the error. A diagnostic log 172 may be generated created after the user alert 165 169 is cleared. The diagnostic log 172 may be sent to the user (or users) for review. The user may write a sub-script 188 based on the diagnostic log 172.

Figure 5:
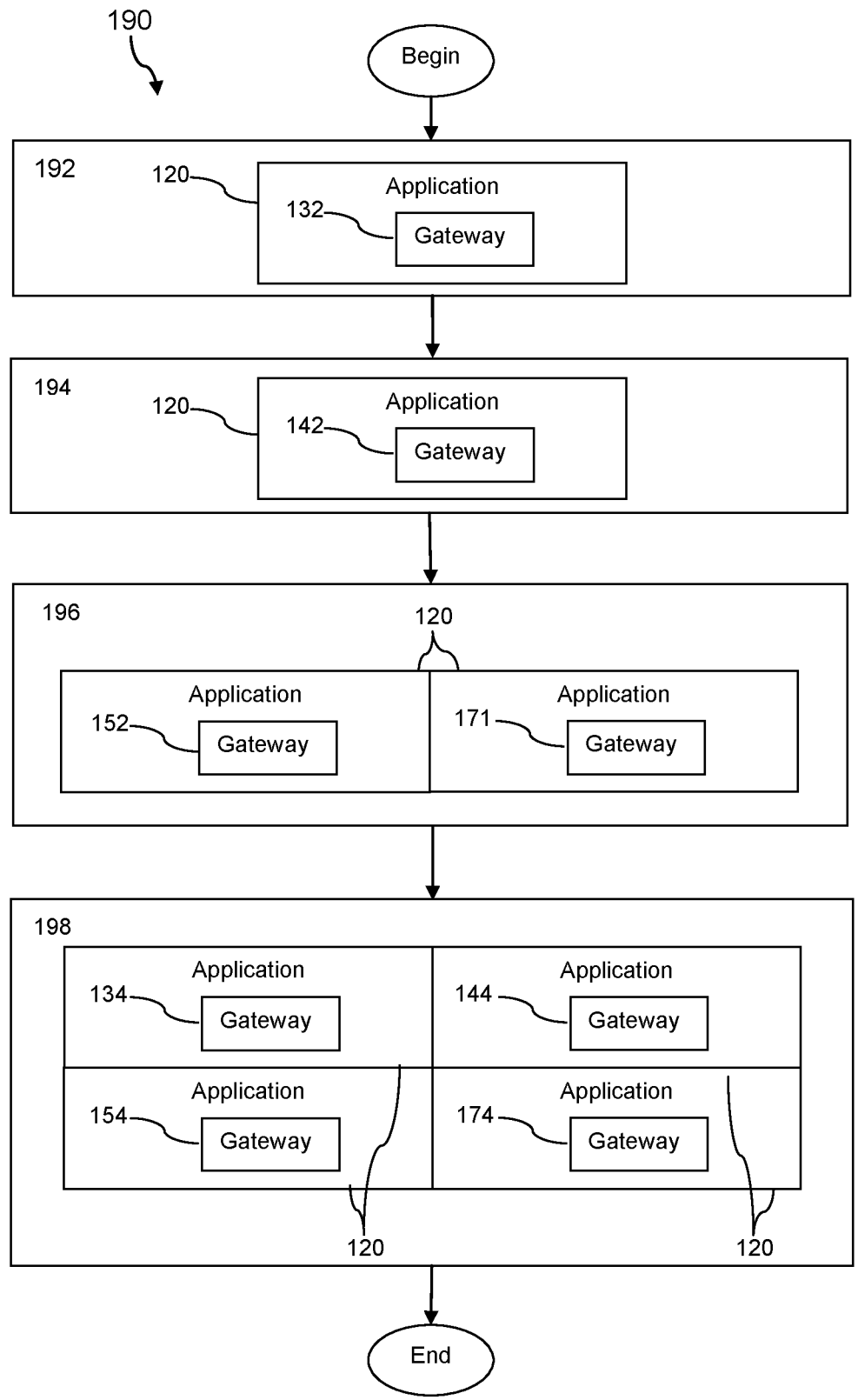
FIG. 5 is a logical flow diagram depicting a scheduler application according to an embodiment of the disclosure.

Turning now to FIG. 5, a logical flow diagram depicting a scheduler application 190 is described. A scheduler application 190 may update one or more gateways within a maintenance time window. Each step of the logical flow diagram represents an update session where one or more gateways are updated by automated diagnostic application 120.

Figure 6:
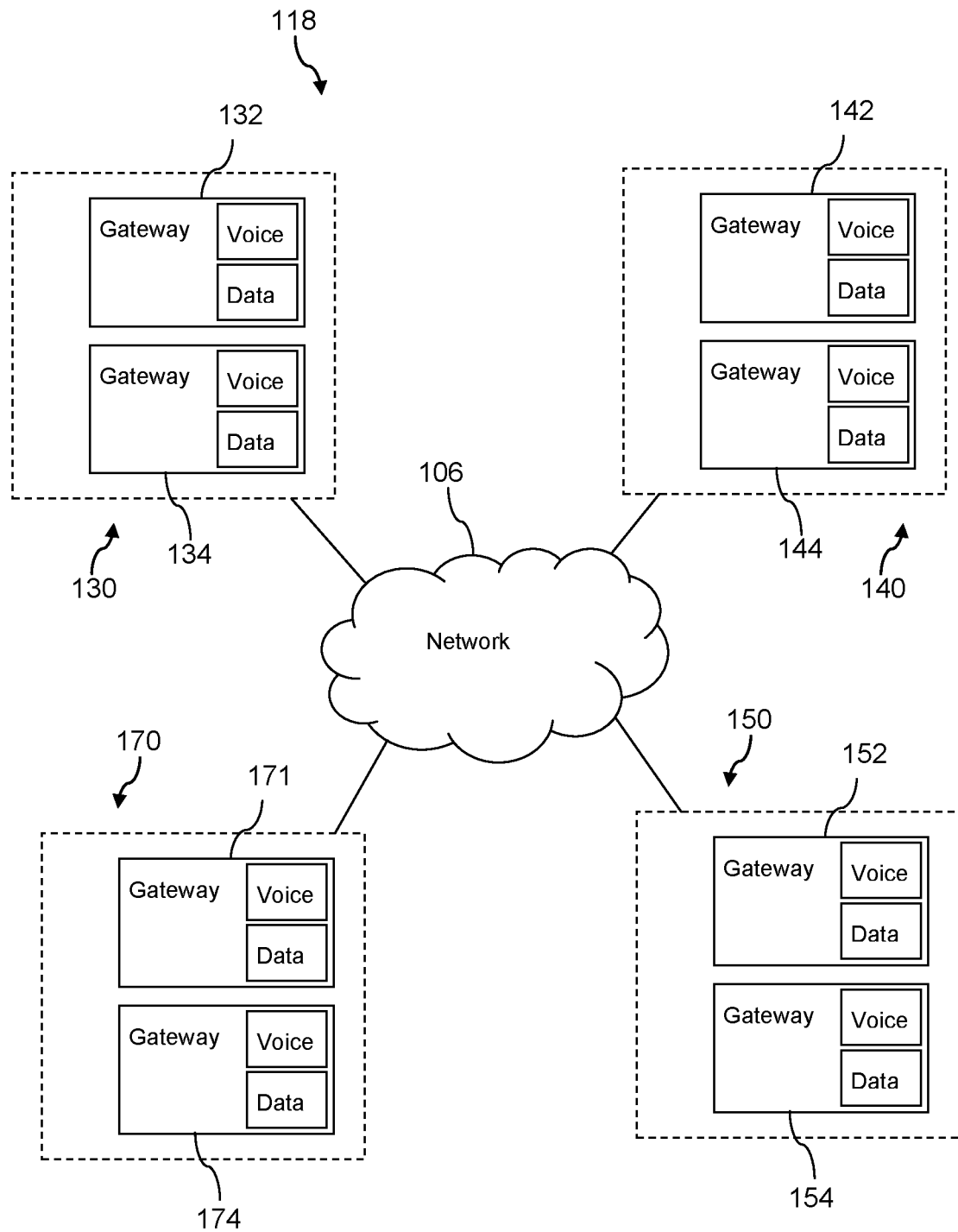
FIG. 6 is a block diagram of a remote gateway cluster according to an embodiment of the disclosure.

The scheduler application 190 may be configured to run one or more update sessions. The scheduler application 190 may be configured to update one or more gateways with the automated diagnostic application 120 in an update session. For example, in FIG. 6, a remote gateway cluster 118 may be communicatively connected to the network 106. The remote gateway cluster 118 may be a pool of regional gateways that service a region of the country. The remote gateway cluster 118 may include cell nodes with an active gateway and a standby gateway.

Each cell node 130, 140, 150, and 170 may be set up with nearly identical sets equipment for a cell node including a cell site, a primary gateway, and a secondary gateway. The cell nodes are functionally identical in that they separate voice traffic and data traffic from the cell sites. The cell nodes may be located in urban areas or rural areas across the region. One cell node may provide cell service to a rural area. Two or more cell nodes may provide cell service in a dense metropolitan area.

Returning to FIG. 5, the scheduler application 190 may be configured to run with four consecutive update sessions 192, 194, 196, and 198. The scheduler application 190 may stop at update session 192 if an error is generated. The scheduler application 190 processing may move sequentially from update session 192 to update session 194 when update session 192 completes without errors. Update session 192 may update a single gateway 142 with the automated diagnostic application 120. Update session 194 may update a single gateway 142 with the automated diagnostic application 120. Update session 196 may update two gateways 142 and 171 concurrently. The update for gateway 142 and gateway 171 may use identical automated diagnostic application 120 with identical automated scripts 160 to update different but similar gateways. Each update session may execute multiple instances of the automated diagnostic application 120 to update identical gateways or servers. The update session 198 may be configured to run four instances of the automated diagnostic application 120 to update four gateways 134, 144, 154, and 174 concurrently.

Turning back to FIG. 6, a user may program the scheduler application 190 to update the gateways for each cell node. The cell node 130 may have a primary gateway 132 and a secondary gateway 134. The scheduler application 190 may be configured to run the primary gateway 132 first at update session 192 as a kind of test case for the automated script 160 embedded inside automated diagnostic application 120. The scheduler application 190 may schedule gateway 132 and gateway 142, both primary gateways, to run sequentially as test cases for the remaining gateways. These may be referred to as a kind of "test cases" because the scheduler application 190 evaluates the results of those operations before initiating a larger scope upgrade sequence.

The scheduler application 190 may be configured to run primary gateway 152 and primary gateway 171 concurrently at update session 196. The scheduler application 190 may launch two copies of the automated diagnostic application 120 with identical automated scripts 160 to perform the concurrent updates.

The scheduler application 190 may be configured to update four secondary gateways 134, 144, 154, and 174 concurrently with update session 198. The scheduler application 190 may launch four instances of the automated diagnostic application 120 with automated script 160 to perform the concurrent updates. All of the secondary gateways 134 may be run concurrently because all of the primary gateway update sessions have been completed. One of the benefits of updating the regional system 118 as described above is that customers may not experience a service interruption with the scheduler application 190 running the gateway updates with an automated diagnostic application 120 monitoring the automated script 160.

Figure 7:
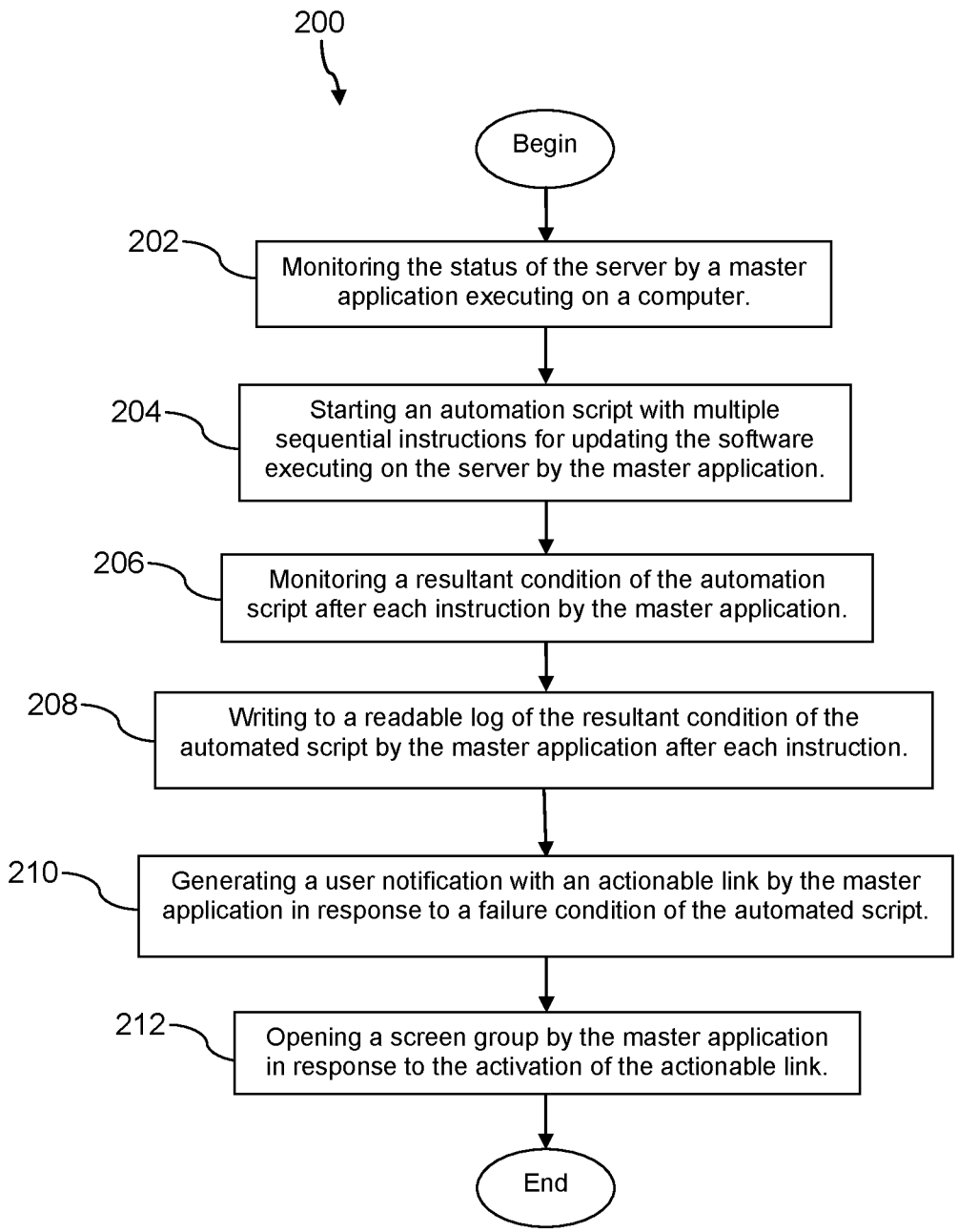
FIG. 7 is a flow chart of a method according to an embodiment of the disclosure.

Turning now to FIG. 7, a method 200 is described. In an embodiment, method 200 is a computer-implemented method of monitoring an automation script modifying software on a server. At block 202, the method 200 comprises monitoring a server for an active customer process by a master application executing on a computer. In an embodiment, the server is a gateway. In an embodiment, the server is a gateway comprising one or more servers. In an embodiment, the master application is the automated diagnostic application.

At block 204, the method 200 comprises starting an automation script with multiple sequential instructions for updating the software executing on the server by the master application. In an embodiment, an instruction is a command. In an embodiment, the instruction may be a line of code. At block 206, the method 200 comprises monitoring a resultant condition of the automation script after each instruction by the master application.

At block 208, the method 200 comprises writing to a readable log of the resultant condition of the automated script by the master application after each instruction. At block 210, the method 200 comprises generating a user notification with an actionable link by the master application in response to a failure condition of the automated script. In an embodiment, the user notification is an email and/or a text message. At block 212, the method 200 comprises opening a screen group by the master application in response to activation of the actionable link.

Figure 8:
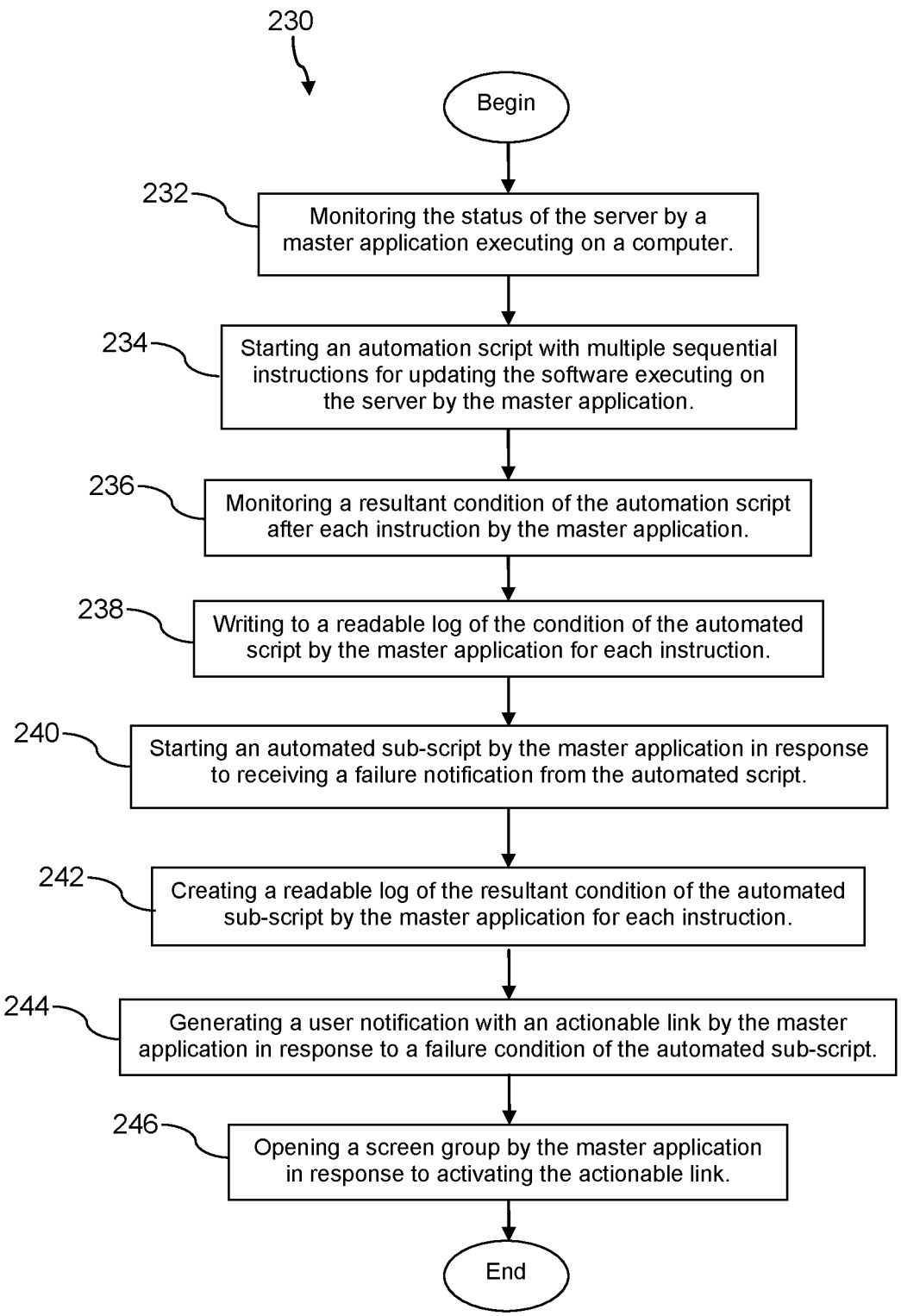
FIG. 8 is a flow chart of a method according to an embodiment of the disclosure.

Turning now to FIG. 8, a method 230 is described. In an embodiment, the method 230 is a computer-implemented method of monitoring an automation script modifying software on a server. At block 232, the method 230 comprises monitoring a status of a server by a master application executing on a computer. At block 234, the method 230 comprises starting an automation script with multiple sequential instructions for updating the software executing on the server by the master application. At block 236, the method 230 comprises monitoring a resultant condition of the automation script after each instruction by the master application. At block 238, the method 230 comprises writing to a readable log of the resultant condition of the automated script by the master application after each instruction.

At block 240, the method 230 comprises starting an automated sub-script by the master application in response to receiving a failure notification from the automated script. At block 242, the method 230 comprises creating a readable log of the resultant condition of the automated sub-script by the master application for each instruction.

At block 244, the method 230 comprises generating a user notification with an actionable link by the master application in response to a failure condition of the automated sub-script. At block 246, the method 230 comprises opening a screen group by the master application in response to activating the actionable link.

Figure 9:
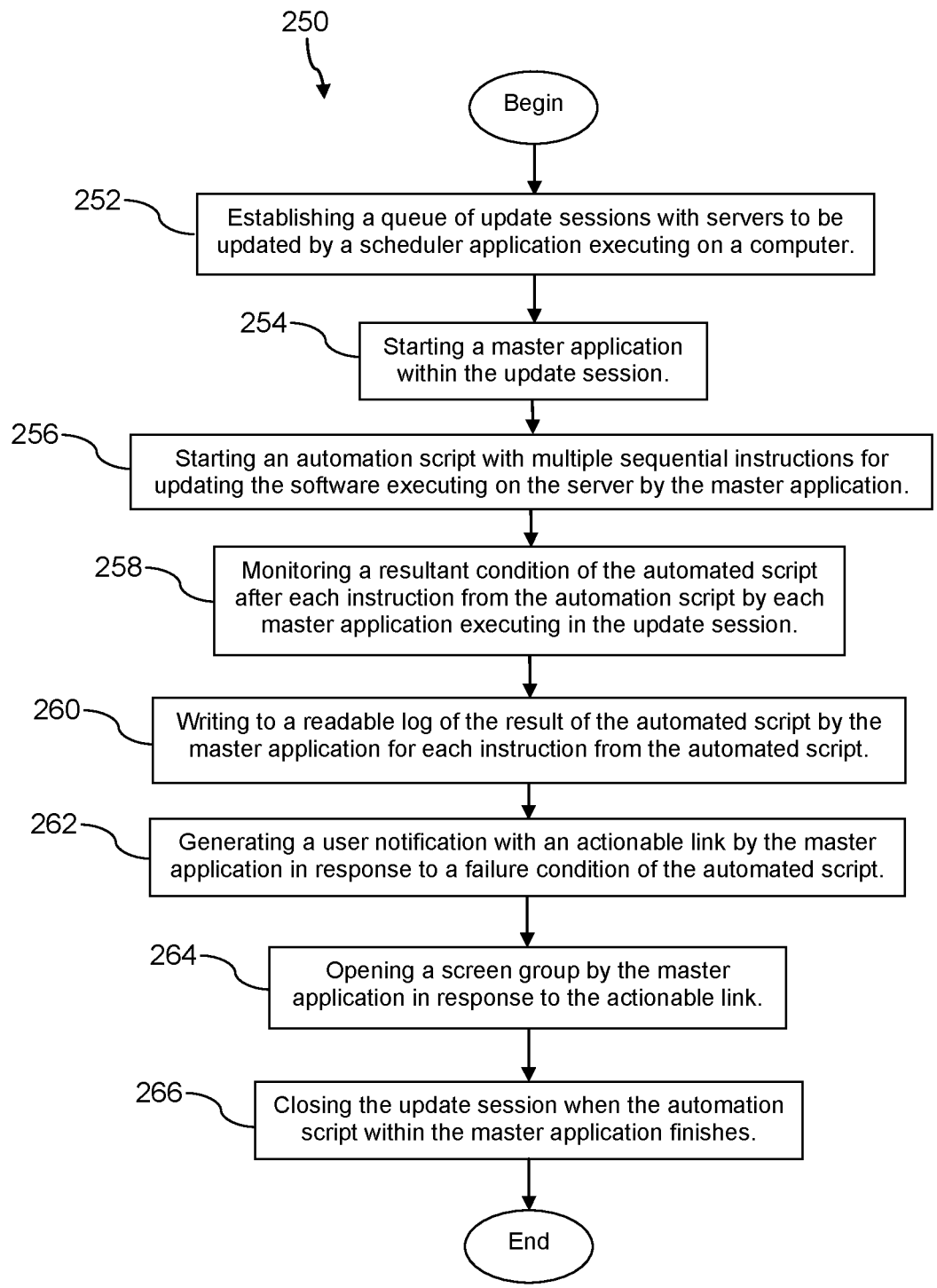
FIG. 9 is a flow chart of a method according to an embodiment of the disclosure.

Turning now to FIG. 9, a method 250 is described. In an embodiment, a computer implemented method of monitoring an automation script modifying software on a server. At block 252, the method 250 comprises establishing a queue of update sessions with servers to be updated by a scheduler application executing on a computer. At block 254, the method 250 comprises starting a master application within the update session.

At block 256, the method 250 comprises starting an automation script with multiple sequential instructions for updating the software executing on the server by the master application. At block 258, the method 250 comprises monitoring a resultant condition of the automated script after each instruction from the automation script by each master application executing in the update session. At block 260, the method 250 comprises writing to a readable log of the result of the automated script by the master application for each instruction from the automated script.

At block 262, the method 250 comprises generating a user notification with an actionable link by the master application in response to a failure condition of the automated script. At block 264, the method 250 comprises opening a screen group by the master application in response to the actionable link.

At block 266, the method 250 comprises closing the update session when the automation script within the master application finishes.

Figure 10:
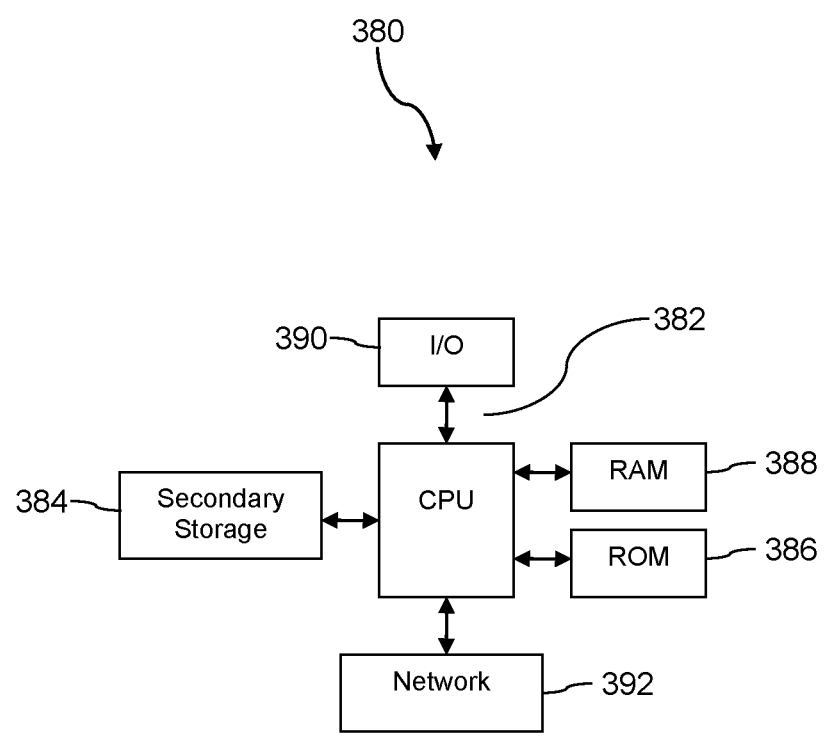
FIG. 10 is a block diagram of a computer system according to an embodiment of the disclosure.

FIG. 10 illustrates a computer system 380 suitable for implementing one or more embodiments disclosed herein. For example, in an embodiment, the user device 104 and the service center server 102 described above may be implemented in a form similar to that of computer system 380. In an embodiment, the gateway 112, 114, 126, 128, 132, 134, 142, 144, 152, 154, 171, and 174 may be comprised of one or more servers as described above and may be implemented in a form similar to that of computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer-readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer-implemented method of monitoring an automation script modifying software on a server, comprising:
monitoring a status of a server by a master application executing on a computer;
starting an automation script with multiple sequential instructions for updating the software executing on the server by the master application;
monitoring a resultant condition of the automation script after each instruction by the master application;
writing to a readable log of the resultant condition of the automation script by the master application after each instruction;
starting an automated sub-script by the master application in response to receiving a failure notification from the automation script, the automated sub-script to execute to mitigate a failure that gave rise to the failure notification from the automation script;
creating a readable log of a resultant condition of the automated sub-script by the master application for each instruction of the automated sub-script;
generating a user notification with an actionable link by the master application in response to a failure condition of the automated sub-script;
halting, by the master application, execution of the automation script on a second server responsive to receiving the failure notification from the automation script, the execution of the automation script on the second server being concurrent with the execution of the automation script on the server; and
opening a screen group by the master application in response to activating the actionable link, the screen group including a screen for providing instructions to the server via an authenticated terminal session with the server.

2. The method of claim 1, wherein:
the screen group includes a screen displaying a readable log of the update to the server from the master application.

3. The method of claim 1, wherein:
the screen group includes a screen displaying a readable automation sub-script from the master application;
the readable automation sub-script includes multiple instructions; and
the readable automation sub-script displays an instruction of the multiple instructions that gave rise to the failure notification.

4. The method of claim 1, wherein:
the screen group includes a screen displaying a readable update procedure from the master application;
the readable update procedure includes multiple instructions; and
the readable update procedure displays an instruction of the multiple instructions that gave rise to the failure notification.

5. The method of claim 1, wherein the server comprises one or more servers.

6. The method of claim 1, wherein the user notification is an email or a text message.

7. A computer-implemented method of monitoring an automation script modifying software on a server, comprising:
establishing a queue of update sessions with servers to be updated by a scheduler application executing on a computer;
starting a master application within an update session of the update sessions;
starting an automation script with multiple sequential instructions for updating the software executing on the server by the master application;
monitoring a resultant condition of the automation script after each instruction from the automation script by each master application executing in the update session;
writing to a readable log of the resultant condition of the automation script by the master application for each instruction from the automation script;
generating a user notification with an actionable link by the master application in response to a failure condition of the automation script;
opening a screen group by the master application in response to the actionable link, the screen group including a screen for providing instructions to the server via an authenticated terminal session with the server;
halting, by the master application, execution of the automation script on a second server of the servers responsive to the failure condition of the automation script, the execution of the automation script on the second server being concurrent with the execution of the automation script on the server; and
closing the update session when the automation script within the master application finishes.

8. The method of claim 7, wherein:
the screen group includes a screen displaying a readable log of the update to the server from the master application.

9. The method of claim 7, wherein:
the screen group includes a screen displaying a readable automation sub-script from the master application;
the readable automation sub-script includes multiple instructions; and
the readable automation sub-script displays an instruction of the multiple instructions that gave rise to the failure condition.

10. The method of claim 7, wherein:
the screen group includes a screen displaying a readable update procedure from the master application;
the readable update procedure includes multiple instructions; and
the readable update procedure displays an instruction of the multiple instructions that gave rise to the failure condition.

11. The method of claim 7, wherein the update session has more than one server to update.

12. A computer-implemented method of monitoring an automation script modifying software on a server, comprising:
monitoring a server for an active customer process by a master application executing on a computer;
starting an automation script with multiple sequential instructions for updating the software executing on the server by the master application;
monitoring a resultant condition of the automation script after each instruction by the master application;

writing to a readable log of the resultant condition of the automation script by the master application after each instruction;

generating a user notification with an actionable link by the master application in response to a failure condition of the automation script;

halting, by the master application, execution of the automation script on a second server responsive to the failure condition of the automation script, the execution of the automation script on the second server being concurrent with the execution of the automation script on the server; and opening a screen group by the master application in response to activation of the actionable link, the screen group including a screen for providing instructions to the server via an authenticated terminal session with the server.

13. The method of claim 12, wherein:

the screen group includes a screen displaying a readable log of the update to the server from the master application.

14. The method of claim 12, wherein:

the screen group includes a screen displaying a readable automation sub-script from the master application;

the readable automation sub-script includes multiple instructions; and the readable automation sub-script displays an instruction of the multiple instructions that gave rise to the failure condition.

15. The method of claim 12, wherein:

the screen group includes a screen displaying a readable update procedure from the master application;

the readable update procedure includes multiple instructions; and the readable update procedure displays an instruction of the multiple instructions that gave rise to the failure condition.

16. The method of claim 12, wherein the server comprises one or more servers.

17. The method of claim 12, wherein the user notification is an email or a text message.

18. The method of claim 12, further comprising:

receiving input, via the screen group, by a user, the input to mitigate a failure that gave rise to the user notification from the automation script; and recording the input received from the user.

19. The method of claim 18, further comprising:

analyzing, via a machine learning application, the recording of the input received by the user; and automatically synthesizing, via the machine learning application, an automated sub-script to mitigate the failure that gave rise to the user notification from the automation script.

20. The method of claim 19, further comprising:

detecting a second failure in execution of the automation script;

automatically executing the automated sub-script in response to detection of the failure, the automated sub-script to mitigate the second failure without requiring user intervention.

* * * * *